(12) United States Patent
Makino et al.

(10) Patent No.: US 10,703,221 B2
(45) Date of Patent: Jul. 7, 2020

(54) POWER SUPPLY CONTROL APPARATUS FOR ELECTRIC VEHICLE

(71) Applicant: MITSUBISHI JIDOSHA KOGYO KABUSHIKI KAISHA, Tokyo (JP)

(72) Inventors: Daiki Makino, Tokyo (JP); Koichi Suzuki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/169,838

(22) Filed: Oct. 24, 2018

(65) Prior Publication Data

US 2019/0143830 A1    May 16, 2019

(30) Foreign Application Priority Data

Nov. 16, 2017 (JP) ................................ 2017-220984

(51) Int. Cl.
*B60L 58/00* (2019.01)
*B60L 58/10* (2019.01)
(Continued)

(52) U.S. Cl.
CPC ............. *B60L 58/10* (2019.02); *B60L 3/0038* (2013.01); *B60L 3/04* (2013.01); *B60L 53/00* (2019.02); *H02J 7/00* (2013.01); *B60K 6/28* (2013.01); *B60L 3/12* (2013.01); *B60L 2240/527* (2013.01); *B60L 2240/549* (2013.01); *B60L 2240/80* (2013.01); *B60L 2250/10* (2013.01); *B60L 2260/22* (2013.01); *B60L 2270/20* (2013.01); *B60Y 2200/91* (2013.01); *B60Y 2200/92* (2013.01); *H02J 7/345* (2013.01); *H02P 27/06* (2013.01)

(58) Field of Classification Search
CPC ............. B60L 58/00; B60L 53/00; B60L 3/00
USPC .......................................................... 307/10.1
See application file for complete search history.

(56) References Cited

U.S. PATENT DOCUMENTS 5,994,789 A * 11/1999 Ochiai .................... B60L 50/51
                                                          307/10.1
6,002,221 A * 12/1999 Ochiai .................. B60L 3/0023
                                                          318/139

(Continued)

FOREIGN PATENT DOCUMENTS

JP        2006-238509 A      9/2006

OTHER PUBLICATIONS

Extended European Search Report issued in the corresponding European Patent Application No. 18205237.3 dated Apr. 16, 2019.

*Primary Examiner* — Rexford N Barnie
*Assistant Examiner* — Joseph N Inge
(74) *Attorney, Agent, or Firm* — Birch, Stewart, Kolasch & Birch, LLP

(57) ABSTRACT

A power supply control apparatus for an electric vehicle includes a main circuit including a smoothing capacitor connecting a power supply to an electric load driven by the power supply to smooth a fluctuation in an input voltage to the electric load, a main contactor interposed between the power supply of the main circuit and the electric load, and a precharge circuit connected in parallel with the main contactor and including a precharge contactor and a resistance element. When a timeout occurs before precharging by the precharge circuit is completed, the power supply control apparatus permits a retry of the precharging if the precharging is retried without any disadvantage.

6 Claims, 9 Drawing Sheets

(51) Int. Cl.
*B60L 3/00* (2019.01)
*B60L 53/00* (2019.01)
*B60L 3/04* (2006.01)
*H02J 7/00* (2006.01)
H02J 7/34 (2006.01)
B60K 6/28 (2007.10)
H02P 27/06 (2006.01)
B60L 3/12 (2006.01)

(56) References Cited

U.S. PATENT DOCUMENTS

| | | | | |
|---|---|---|---|---|
| 6,329,772 | B1* | 12/2001 | Ochiai | B60K 6/48 |
| | | | | 318/139 |
| 6,488,107 | B1* | 12/2002 | Ochiai | B60K 6/48 |
| | | | | 180/65.25 |
| 2001/0053950 | A1* | 12/2001 | Hasegawa | B60L 58/34 |
| | | | | 701/22 |
| 2004/0026140 | A1* | 2/2004 | Suzuki | B60K 6/485 |
| | | | | 180/65.26 |
| 2008/0185999 | A1* | 8/2008 | Matsukawa | H02J 7/0077 |
| | | | | 320/166 |
| 2015/0251542 | A1* | 9/2015 | Mensah-Brown | B60L 50/51 |
| | | | | 307/10.1 |

* cited by examiner

POWER SUPPLY CONTROL APPARATUS FOR ELECTRIC VEHICLE

BACKGROUND OF THE INVENTION

Field of the Invention

The present invention relates to a power supply control apparatus for an electric vehicle, and in particular, to control of a precharge circuit configured to suppress a rush current to a smoothing capacitor integrated into a power supply circuit.

Description of the Related Art

A battery pack including a large number of unit batteries connected together as a power supply for an electric motor is mounted in, for example, an electric car equipped with the electric motor as a driving power source or a hybrid vehicle equipped with the electric motor and a driving or power-generating engine as a driving power source or the like (hereinafter referred to as an electric vehicle). A power supply circuit is provided between the battery pack and the electric motor, and an inverter of the power supply circuit converts DC power of the battery pack into three-phase AC power to supply the AC power to the electric motor.

A first main contactor is installed on a cathode side of the power supply circuit, and a second main contactor is installed on an anode side of the power supply circuit. A smoothing capacitor is connected between each main contactor and equipment such as an inverter which operates at a high voltage. The smoothing capacitor is connected in parallel with the equipment. The smoothing capacitor smooths a fluctuation (ripple) in the voltage to the equipment.

When the electric vehicle is started, the first and the second main contactors are turned on to electrically connect the battery pack to the inverter. However, at this time, the smoothing capacitor contains substantially no charge, and thus, a large current from the battery pack, which is a high voltage power supply, flows to the main contactors, in which a failure such as fusion may occur. To prevent such a failure, the power supply circuit is provided with a precharge circuit. The precharge circuit is configured to include a precharge contactor and a resistance element connected in series. The precharge circuit is connected in parallel with the first or second main contactor.

When the electric vehicle is started, first, the precharge contactor and one of the first and the second main contactors that is not connected in parallel with the precharge contactor are turned on. A current from the battery pack is provided to the smoothing capacitor for charging while being limited by the resistance element of the precharge circuit. This prevents possible fusion or the like of the main contactors. Once precharging of the smoothing capacitor is completed, the main contactor connected in parallel with the precharge contactor is turned on and the precharge contactor is turned off. The precharging is thus completed.

An electric vehicle with such a precharge circuit involves determination of a timing to complete precharging. For example, a technique in Patent Literature (Japanese Patent Laid-Open No. 2006-238509) includes calculating a change rate of a precharge current flowing through the power supply circuit during precharging, and if the change rate exceeds a reference change rate, determining that the precharging is completed.

If the power supply circuit functions normally, the precharging is to be completed. However, a certain abnormality may prevent the precharging from being completed. For example, the technique in the Patent Literature mentioned above includes turning off the precharge contactor to interrupt the power supply circuit if a predetermined time has elapsed (this is hereinafter referred to as timeout) before a condition for the change rate of the precharge current is met.

If a short circuit failure has occurred in the power supply circuit, a retry of the precharging causes the current provided during the precharging to continuously and excessively flow through the resistance element of the precharge circuit, leading to abnormal heat generation. This in turn causes, for example, erosion of a resin member fixing the resistance element (this is hereinafter expressed as erosion of peripheral members of the resistance element). In the related art, an operation of restarting the vehicle (retry of the precharging) is inhibited if one timeout occurs.

However, if the circuit or the like is actually not abnormal but a timeout is detected due to any transient defect, useless inhibition of a retry may disable driving of the vehicle though the retry enables the vehicle to be normally started.

SUMMARY OF THE INVENTION

In view of the above-described circumstances, an object of the present invention is to provide a power supply control apparatus for an electric vehicle that is capable of preventatively avoiding possible disabling of driving of a vehicle if a timeout is caused by a transient defect, by permitting a retry of precharging of a smoothing capacitor if the precharging is retried without any disadvantage, when the timeout occurs before the precharging is completed.

To accomplish this object, a power supply control apparatus for an electric vehicle according to an aspect of the present invention includes A power supply control apparatus for an electric vehicle, the power supply control apparatus comprising: a main circuit including a smoothing capacitor connecting a power supply to an electric load driven by the power supply to smooth a fluctuation in an input voltage to the electric load, a main contactor interposed between the power supply of the main circuit and the electric load, a precharge circuit connected in parallel with the main contactor and including a precharge contactor and a resistance element, a precharge controller that connects the main contactor and the precharge contactor together to precharge the smoothing capacitor, a voltage detector that detects, as a capacitor voltage, a voltage of the smoothing capacitor gradually increasing with progression of charging during the precharging, a current detector that detects, as a precharge current, a current flowing through the main circuit and gradually decreasing with progression of charging of the smoothing capacitor during the precharging, a precharge completion determining unit that determines, during the precharging, completion of the precharging based on the capacitor voltage, and a retry permitting unit that grants the precharge controller permission to retry the precharging under a condition that the precharge current enters a permission region predefined based on a predetermined current range including 0 A and a predetermined period during the precharging, when a timeout occurs before the precharge completion determining unit determines completion of the precharging.

In the power supply control apparatus for the electric vehicle configured as described above, when the main circuit is normal, the precharge current rises simultaneously with connection of the precharge contactor, and subsequently gradually decreases with progression of charging of the smoothing capacitor. In contrast, if a certain failure has occurred in the main circuit, the precharge current varies along different trajectories according to the contents of the failure.

If the precharge current fails to enter the permission region when a timeout occurs before the precharging is determined to be completed, a short circuit failure of a magnitude exceeding a permissible current may have occurred in the main circuit. At this time, no retry of the precharging is permitted. In contrast, if the precharge current enters the permission region, the situation is assumed to correspond to an open circuit failure or a minor short circuit failure not enough to cause erosion of peripheral members even when the resistance element generates heat. A retry of the precharging is thus permitted.

As described above, the power supply control apparatus for the electric vehicle according to the aspects of the present invention is capable of preventatively avoiding possible disabling of driving of the vehicle if a timeout is caused by a transient defect by permitting a retry of the precharging of the smoothing capacitor if the precharging is retried without any disadvantage, when the timeout occurs before the precharging is completed.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

An embodiment will be described below in which the present invention is embodied in a power supply control apparatus for an electric car.

Figure 1:
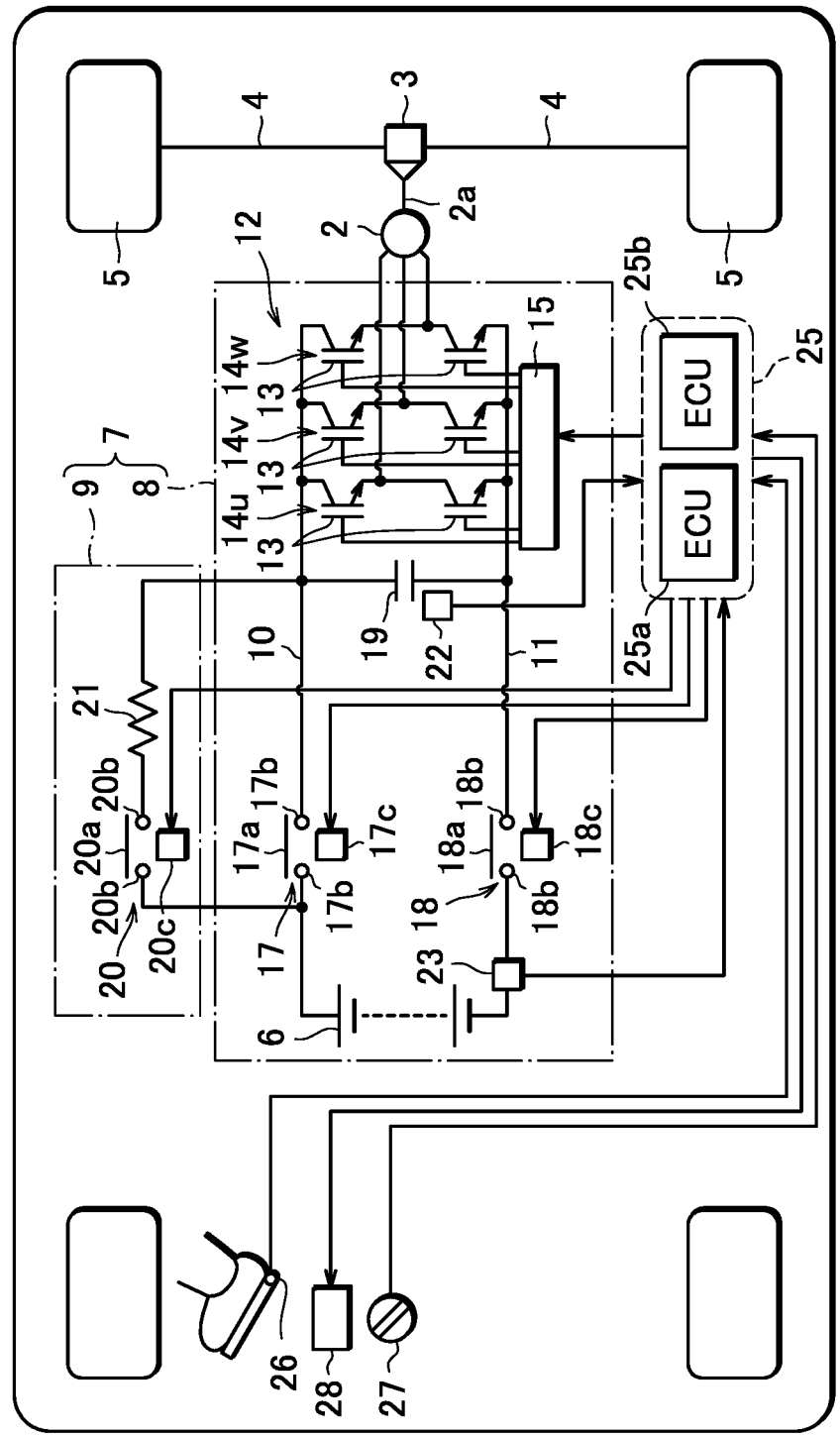
FIG. 1 is a diagram schematically illustrating a general configuration of a power supply control apparatus for an electric car according to an embodiment.

FIG. 1 is a diagram schematically illustrating a general configuration of the power supply control apparatus for the electric car according to an embodiment. An electric car 1 (hereinafter simply referred to as the vehicle) is equipped with a motor generator 2(electric load) as a driving power source. The motor generator 2 is a three-phase AC motor including a U-phase coil, a V-phase coil, and a W-phase coil, and functions as an electric motor and a generator. An output shaft 2a of the motor generator 2 is coupled to a differential gear 3, which is coupled to wheels 5 of the vehicle 1 via a right and left drive shafts 4.

As a power supply for the motor generator 2, the vehicle 1 is equipped with a battery pack 6 including a large number of unit batteries connected in series, and a power supply circuit 7 is provided between the battery pack 6 and the motor generator 2. The power supply circuit 7 electrically connects and disconnects the battery pack 6 to and from the motor generator 2 and converts DC power into three-phase AC power and vice versa.

The power supply circuit 7 includes a main circuit 8 and a precharge circuit 9. One end of a power supply line 10 of the main circuit 8 is connected to a cathode of the battery pack 6. One end of an anode 11 of the main circuit 8 is connected to an anode of the battery pack 6. An inverter 12 included in the main circuit 8 includes a U-phase circuit 14u, a V-phase circuit 14v, and a W-phase circuit 14w each including a pair of switching elements 13 connected in series. Although not illustrated in the drawing, diodes are connected in anti-parallel with the respective switching elements 13.

The phase circuits 14u, 14v, 14w of the inverter 12 are connected together in parallel between the above-described power supply line 10 and the anode 11. Connection points are each located between the switching elements 13 of the corresponding one of the phase circuits 14u, 14v, 14w, and are connected to respective phases of the motor generator 2. The switching elements 13 of each of the phase circuits 14u, 14v, 14w are each connected to a drive circuit 15, which drives the inverter 12.

A first main contactor 17 is installed on the power supply line 10 of the main circuit 8. A second main contactor 18 is installed on the anode 11. The main contactors 17, 18 have movable contacts 17a, 18a, fixed contacts 17b, 18b, and coils 17c, 18c, respectively. The movable contacts 17a, 18a are made electrically continuous with or discontinuous from the fixed contacts 17b, 18b in response to excitation and demagnetization of the coils 17c, 18c, respectively.

A smoothing capacitor 19 is connected between the inverter 12 and the first and the second main contactors 17, 18 in parallel with the inverter 12. The smoothing capacitor 19 has a function to smooth a fluctuation (ripple) in an input voltage to the inverter 12.

When both the first and the second main contactors 17, 18 are made electrically continuous, the battery pack 6 and the inverter 12 are electrically connected together. Actuation of the motor generator 2 as a motor thus causes the inverter 12 to convert the DC power of the battery pack 6 into three-phase AC power, which is supplied to the motor generator 2. A drive force of the motor generator 2 is transmitted to the wheels 5 to drive the vehicle 1. Furthermore, when the vehicle 1 decelerates or travels downhill, counter driving by the wheel 5 side actuates the motor generator 2 as a generator to generate three-phase AC power. The inverter 12 then converts the generated three-phase AC power into DC power, which is provided to the battery pack 6.

The precharge circuit 9 is configured to include a precharge contactor 20 and a resistance element 21 connected in series, and connected in parallel with the first main contactor 17. Like the main contactors 17, 18, the precharge contactor 20 has a movable contact 20*a*, a fixed contact 20*b*, and a coil 20*c*. The movable contact 20*a* is made electrically continuous with or discontinuous from the fixed contact 20*b* in response to excitation and demagnetization of the coil 20*c*.

A voltage sensor 22 (voltage detector) is disposed at the smoothing capacitor 19. A current sensor 23 (current detector) is installed on the anode 11 of the main circuit 8. During precharging of the smoothing capacitor 19, a voltage between terminals of the smoothing capacitor 19 is detected by the voltage sensor 22 as a capacitor voltage Vcon. A current flowing through the main circuit 8 is detected by the current sensor 23 as a precharge current Ipre.

An output side of an ECU 25 executing integrated control of the vehicle 1 connects to, for example, the coils 17*c*, 18*c*, 20*c* of the main contactors 17, 18 and the precharge contactor 20, the drive circuit 15 of the inverter 12, and a warning device 28 provided at a driver's seat of the vehicle 1. An input side of the ECU 25 connects to, for example, the voltage sensor 22, the current sensor 23, an accelerator sensor 26 detecting the amount of operation of an accelerator pedal, and an ignition switch 27 of the vehicle 1.

The ECU 25 includes an ECU 25*a* for contactor control and an ECU 25*b* for driving control. Each of the ECUs 25*a*, 25*b* includes an input/output device, a storage device (ROM, RAM, nonvolatile RAM, or the like), a central processing unit (CPU), and the like. The ECU 25*a* for contactor control performs control of connection and disconnection of the contactors 17, 18, 20. The ECU 25*b* for driving control, for example, controls the inverter 12 for operating the motor generator 2. The above-described storage device for the ECUs 25*a* and 25*b*, for example, the nonvolatile RAM, stores commands for allowing the CPU to execute the above-described control.

The power supply control apparatus for the electric car 1 according to the present embodiment is configured as described above. A process executed in starting the vehicle 1 will now be described.

An ON operation on the main contactors 17, 18 for starting the vehicle 1 is executed, for example, when the ignition switch 27 is turned on to drive the vehicle 1 or when a charging connector at a charging station or the like is connected to a charging port of the vehicle 1 not illustrated in the drawing, to charge the battery pack 6.

Figure 2:
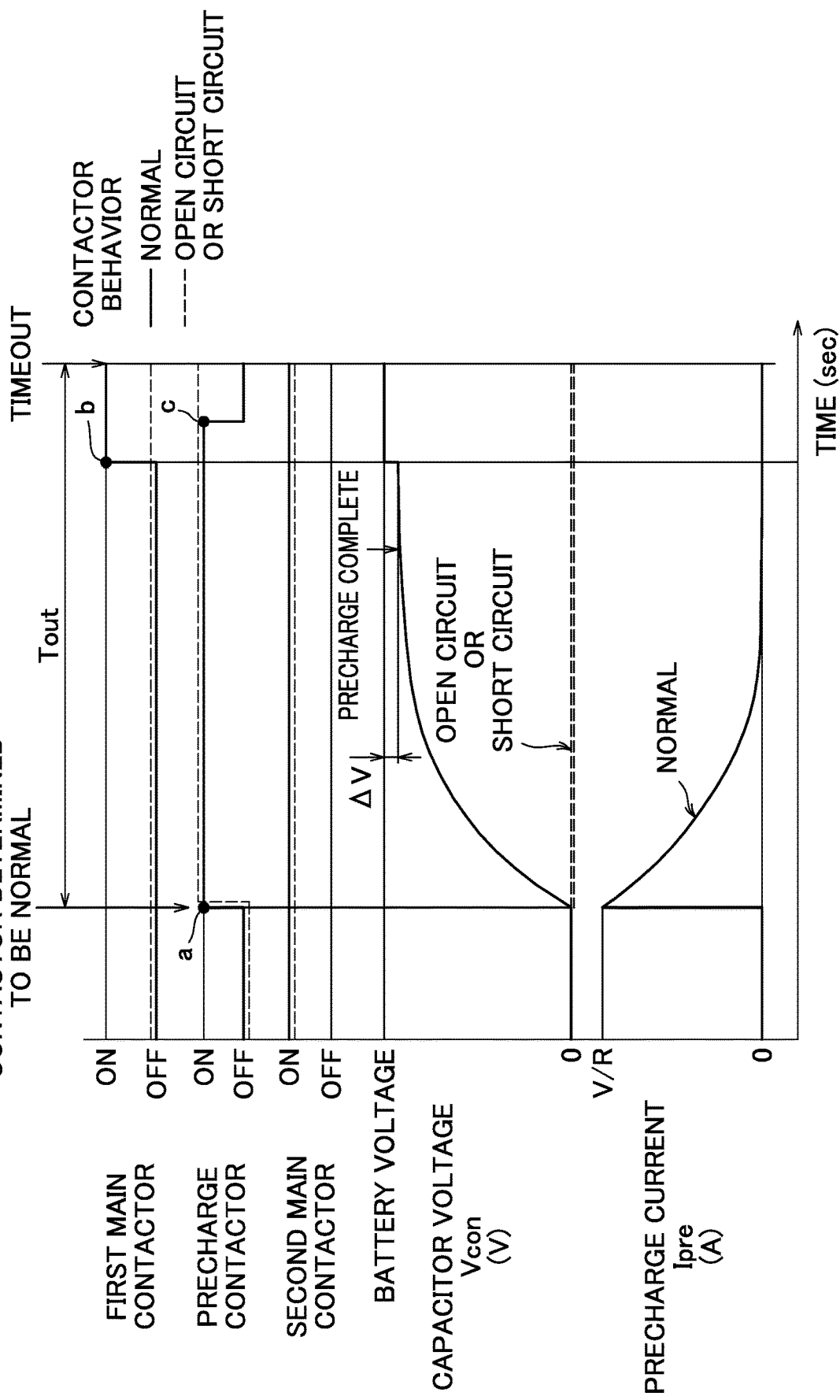
FIG. 2 is a time chart illustrating an execution status of precharging when a vehicle is started.

A process executed by the ECU 25*a* for contactor control during starting of the vehicle 1 will be described below. FIG. 2 is a time chart illustrating an execution status of precharging during starting of the vehicle 1.

For example, when the ignition switch 27 is turned on, possible fusion of the contactors 17, 18, 20 is detected in a preprocess. Details of the fusion detection are well known, and thus, detailed description of the fusion detection is omitted. Whether or not fusion has occurred is determined based on a comparison between a voltage V of the battery pack 6 (hereinafter simply referred to as a battery voltage) and an inverter 12 side voltage when the contactors 17, 18, 20 are sequentially turned on. When no fusion is detected and all the contactors 17, 18, 20 are determined to be normal, the precharge contactor 20 is turned on (point a in FIG. 2). At the time of the fusion determination, the second main contactor 18 has already been turned on. A current from the battery pack 6 is provided to the smoothing capacitor 19 while being limited by the resistance element 21 of the precharge circuit 9, thus preventing fusion of the main contactors 17, 18, which are subsequently turned on. When executing the precharging, the ECU 25*a* functions as precharge controller according to the present invention.

If the power supply circuit 7 is normal, the capacitor voltage Vcon gradually increases to approach the battery voltage V. Under the condition that a difference $\Delta V$ between the battery voltage V and the capacitor voltage Vcon is smaller than or equal to a predetermined voltage determination value $\Delta V0$ ($\Delta V \leq \Delta V0$ )(the condition is hereinafter referred to as the condition regarding the capacitor voltage Vcon), the precharging is determined to be completed, and the first main contactor is turned on (point b in FIG. 2). The precharge contactor 20 is subsequently turned off to complete the precharging of the smoothing capacitor 19 for high-voltage equipment (point c in FIG. 2).

If any abnormality has occurred in the power supply circuit 7, the condition regarding the capacitor voltage Vcon described above fails to be met. If a timeout time Tout described below elapses to cause a timeout, the precharging is determined to be disabled. The precharge contactor 20 is then turned off to interrupt the power supply circuit 7. A failure code indicating disabling of the precharging is stored, and a message indicating disabling of driving of the vehicle 1 is displayed on the warning device 28.

In the related art, if a timeout occurs before precharging is completed as described above, a restarting operation (a retry of precharging) for the vehicle 1 is inhibited. However, the cause of the timeout may be a transient defect as described in Description of the Related Art. Thus, even though the vehicle 1 can be started by retrying the precharging, the retry is inappropriately inhibited to disadvantageously disable driving of the vehicle 1 on a street.

In view of these disadvantages, the present inventor has studied the cause of timeouts, in other words, contents of failures that may occur in the power supply circuit 7. If a short circuit failure (short circuit) of a magnitude exceeding the permissible current has occurred in the power supply circuit 7, a retry of the precharging is to be avoided because the retry causes the resistance element 21 to generate heat to erode peripheral members of the resistance element 21.

In contrast, if an open circuit failure (disconnection, contactor stuck open) occurs in the power supply circuit 7, a retry of the precharging does not cause serious trouble such as erosion of the peripheral members of the resistance element 21. Furthermore, in some cases, a minor short circuit may not cause erosion of the peripheral members even if the resistance element 21 generates heat. Therefore, in these cases, the precharging is retried without any disadvantage. However, as illustrated by a dash line in FIG. 2, the capacitor voltage Vcon fails to rise in both cases of an open circuit failure and a complete short circuit failure. This precludes determination of whether the failure is an open circuit failure or a complete short circuit failure based on the capacitor voltage Vcon.

The present inventor has thus focused on a variation in precharge current Ipre. If the power supply circuit 7 is normal, the precharge current Ipre rises simultaneously with turn-on of the precharge contactor 20, and subsequently gradually decreases to approach 0 A (ampere) with progression of charging of the smoothing capacitor 19. In contrast, if a certain failure has occurred in the power supply circuit 7, the precharge current Ipre varies along different trajectories according to the contents of the failure. Thus, the present inventor has found that the contents of the failure in the power supply circuit 7 and thus whether or not to enable a retry of the precharging can be determined based on a variation in precharge current Ipre.

First to fourth embodiments will be described below in conjunction with techniques for determining whether or not to enable a retry of the precharging based on different ideas while focusing on trajectories of a variation in precharge current Ipre as described above.

First Embodiment

Simply stated, a technique according to the present embodiment is based on the idea that the precharging is retried without any disadvantage if a minor short circuit does not lead to erosion of the peripheral members of the resistance element 21 and is thus tolerable.

Figure 3:
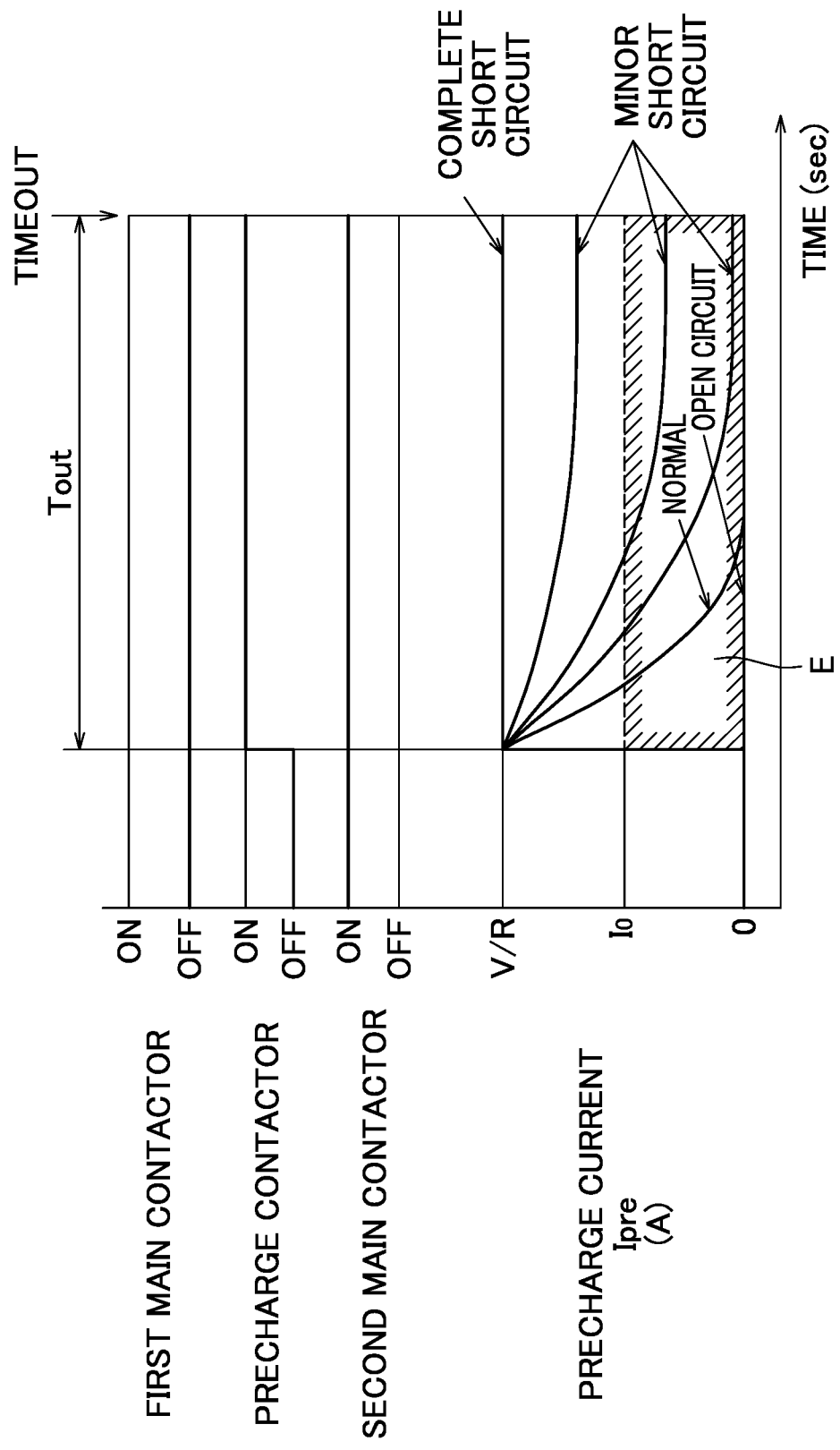
FIG. 3 is a time chart illustrating determination of whether or not to permit a retry based on a variation in precharge current according to a first embodiment.

FIG. 3 is a time chart illustrating determination of whether or not to enable a retry based on a variation in precharge current Ipre. Whether or not the peripheral members of the resistance element 21 are eroded may be determined from a rated capacitance of the resistance element 21 or a specific permissible current determined from the permissible amount of heat generation determined by a permissible temperature for the peripheral components. A permission determination value I0 is set on a low current side defined with respect to the permissible current for the resistance element 21 with a slight margin taken into account, and a retry of precharging is permitted if the precharge current Ipre decreases to the permission determination value I0 or smaller during the precharging.

Therefore, when a region for which the precharging is permitted (hereinafter referred to as the permission region E) is defined based on current and periods, the permission region E may be expressed as a region spanning the entire period of the precharging (predetermined period) and having a lower limit of 0 A and an upper limit equal to the permission determination value I0 (predetermined current range). A retry of the precharging is permitted under the condition that the precharge current Ipre enters the permission region E.

Determination of whether or not to permit a retry of the precharging based on the permission region E will be described below according to the contents of a failure.

First, the precharge current Ipre varies along trajectories described below according to the contents of a failure. As described above, if the power supply circuit 7 is normal, the precharge current Ipre rises simultaneously with turn-on of the precharge contactor 20, and subsequently gradually decreases to approach 0 A as illustrated by a solid line in FIG. 3. At the moment when the precharge contactor 20 is turned on, the smoothing capacitor 19 has not started being charged, and thus, at the moment of the rise, the precharge current Ipre reaches a V/R equivalent value (V: battery voltage, R: resistance of the resistance element 21).

In contrast, in the case of a complete short circuit failure, the precharge current Ipre rises simultaneously with turn-on of the precharge contactor 20, and is maintained at the V/R equivalent value during the precharging.

In the case of an open circuit failure, the precharge current Ipre does not rise in spite of turn-on of the precharge contactor 20, and is maintained at 0 A even during the precharging.

In the case of a minor short circuit failure, the precharge current Ipre varies along a trajectory between a trajectory for the normal power supply circuit 7 and a trajectory for a complete short circuit failure. That is, the precharge current Ipre in this case gradually decreases after rising as is the case with normal charging but does not decrease to 0 A. The precharge current Ipre comes to equilibrium on a higher current side the more serious the short circuit failure is (closer to a complete short circuit). Therefore, in the case of a minor short circuit failure, the precharge current Ipre comes to equilibrium, in some cases, on a high current side with respect to the permission determination value I0, and in other cases, on a low current side with respect to the permission determination value I0.

The above relationship between the trajectory of the precharge current Ipre and the contents of the failure also applies to the second to the fourth embodiments described below.

A process of determining whether or not to enable a retry of the precharging is executed by the ECU 25a based on the permission region E and the precharge current Ipre varying along the trajectory as described above. This control is executed if a timeout occurs before the above-described precharging is completed. Thus, first, a precharge completion determination process executed by the ECU 25a based on a condition regarding the capacitor voltage Vcon will be described. When executing the precharge completion determination process, the ECU 25a functions as precharge completion determination unit according to the present invention.

Figure 4:
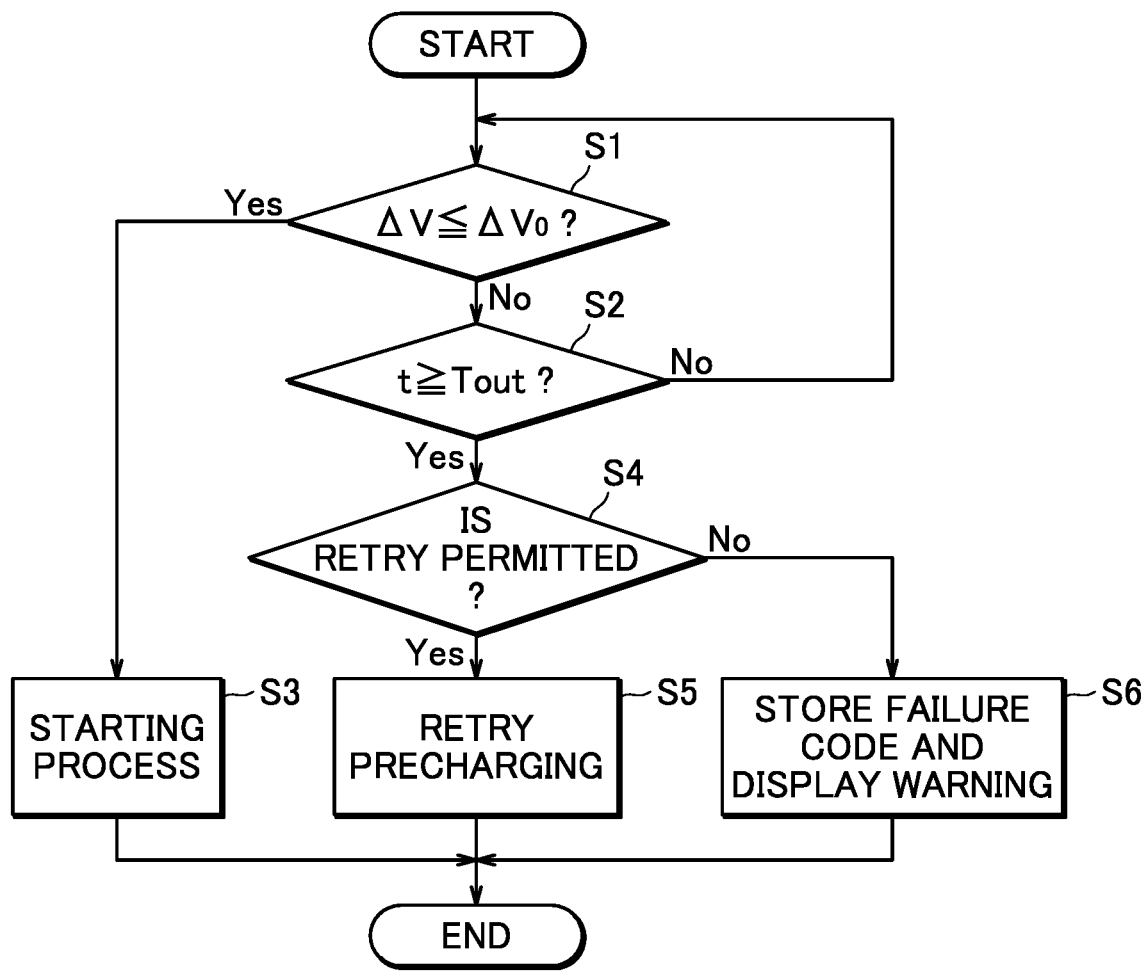
FIG. 4 is a flowchart illustrating a precharge completion determination process executed by an ECU.

FIG. 4 is a flowchart illustrating the precharge completion determination process executed by the ECU 25a. When turning the precharge contactor 20 on in order to precharge the smoothing capacitor 19 after executing fusion detection on the contactors 17, 18, 20 as described above, the ECU 25a executes the following routine at predetermined control intervals.

First, in step S1, the ECU 25a determines whether or not the difference ΔV between the battery voltage V and the capacitor voltage Vcon is lower than or equal to the predetermined voltage determination value ΔV0, and when the determination in step S1 is No (negative), shifts to step S2. In step S2, the ECU 25a determines whether or not an elapsed time t from the start of the precharging has reached a preset timeout time Tout, and when the determination in step S2 is No, returns to step S1 to repeat the process in steps S1 and S2.

When the determination in step S1 is Yes (affirmative), the ECU 25a assumes that the precharging is completed to execute a process of starting the vehicle 1 in step S3 and then end the routine. Since the precharging is already completed, a subsequent process of switching the first main contactor 17 and the precharge contactor 20 is executed in step S3.

When the determination in step S2 is Yes based on the timeout, the ECU 25a assumes that the precharging is disabled to determine in step S4 whether or not a retry of the precharging has been permitted. The determination process in step S4 is based on a process of determining whether or not to enable a retry of the precharging which process is executed in parallel with the routine and will be described below in detail. When the determination in step S4 is Yes, the precharging is retried in step S5. When the determination in step S4 is No, in step S6, the ECU 25a stores a failure code indicating that the precharging is disabled, displays, on the warning device 28, a message indicating that driving of the vehicle 1 is disabled, and then ends the routine.

The above-described precharge completion determination process is executed in the same manner in the second to the fourth embodiments described below.

Figure 5:
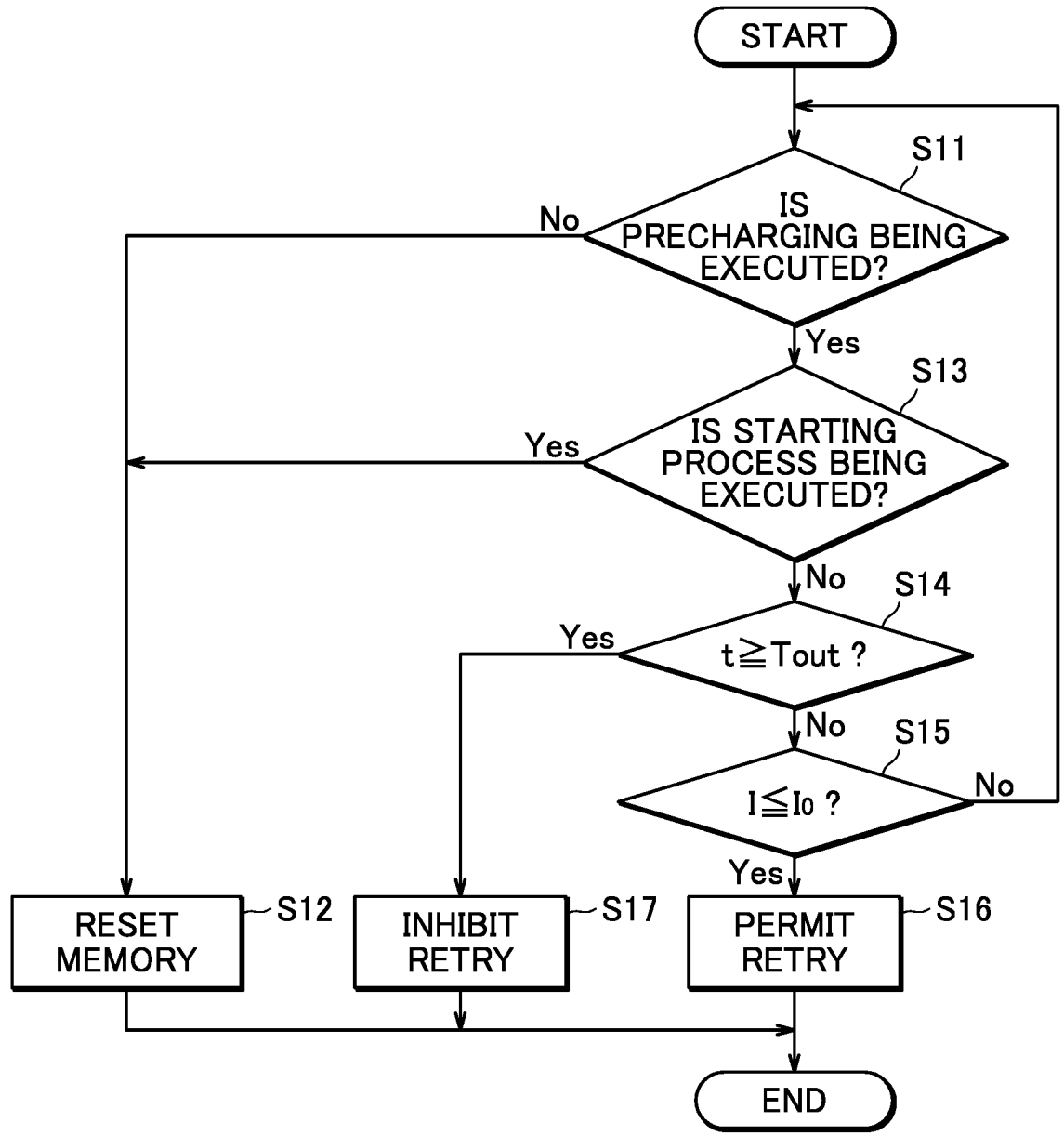
FIG. 5 is a flowchart of a process of determining whether or not to permit a retry of precharging which is executed by the ECU according to the first embodiment and a second embodiment.

The ECU 25a executes, in parallel with the routine in FIG. 4, the process of determining whether or not to enable a retry of the precharging as illustrated in FIG. 5. When executing the process of determining whether or not to enable a retry of the precharging, the ECU 25a functions as retry permitting unit according to the present invention.

First, the ECU 25a determines in step S11 whether or not precharging is being executed. When the determination in step S11 is No, in step S12, the ECU 25a resets the memory and then ends the routine. This is because, if no precharging is being executed, information used to determine whether or not to enable a retry is not needed. When the determination in step S11 is Yes, the ECU 25a shifts to step S13 to determine whether or not, in step S3 in FIG. 4, the process of starting the vehicle 1 is being executed in response to completion of precharging. When the determination in step S13 is No, the ECU 25a shifts to step S14 to determine whether or not the elapsed time t has reached the timeout time Tout.

When the determination in step S14 is No, the ECU 25a determines in step S15 whether or not the precharge current Ipre is smaller than or equal to the permission determination value I0. When the determination in step S15 is No, the ECU 25a returns to step S11 to repeat the process in steps S11 and S13 to S15.

When the determination in step S13 is Yes due to completion of the precharging, the ECU 25a shifts to step S12. Determination of whether or not to enable a retry is no longer needed, and thus, information such as the elapsed time t is deleted from the memory.

When the determination in step S15 is Yes, the ECU 25a grants permission to retry the precharging, i.e., the ECU 25a permits a retry of the precharging in step S16. When the determination in step S14 is Yes, the ECU 25a does not grant permission to retry the precharging, i.e., the ECU 25a inhibits a retry of the precharging in step S17. Based on the permission and inhibition determination, the above-described determination process in step S4 in FIG. 4 is executed.

If the determination in step S14 is Yes, the precharge current Ipre is assumed to have not entered the permission region E during the precharge period. A trajectory that may be followed by the precharge current Ipre in this case corresponds to one of a complete short circuit failure in which the precharge current Ipre is maintained at the V/R equivalent value and a minor short circuit failure in which the precharge current Ipre comes to equilibrium on a high current side with respect to the permission determination value I0, as illustrated in FIG. 3. In either of the cases, the precharge current Ipre does not decrease to the permission determination value I0 or smaller. A retry of the precharging thus causes the precharge current Ipre to follow a similar trajectory again, and thus, the precharge current Ipre exceeding the permissible current (slightly larger than the permission determination value I0) flows through the resistance element 21, making the peripheral members of the resistance element 21 likely to be eroded. In this case, a retry of the precharging is inhibited in step S17, and thus, the precharging is not retried in step S5 in FIG. 4.

If the determination in step S15 is Yes, the precharge current Ipre is assumed to have entered the permission region E during the precharge period. A trajectory that may be followed by the precharge current Ipre in this case corresponds to one of the normal state of the power supply circuit 7 in which the precharge current Ipre gradually approaches 0 A, a minor short circuit failure in which the precharge current Ipre comes to equilibrium on a low current side with respect to the permission determination value I0, and an open circuit failure in which the precharge current Ipre is maintained at 0 A, as illustrated in FIG. 3. In all the cases, the precharge current Ipre decreases to the permission determination value I0 or smaller.

Even if the precharging is retried, the precharge current Ipre is caused to follow a similar trajectory again to decrease to the permission determination value I0 or below, which is smaller than the permissible current for the resistance element 21. The possibility that the peripheral members of the resistance element 21 are eroded is thus close to zero. Therefore, in this case, a retry of the precharging is permitted in step S16, that is, and thus, the precharging is retried in step S5 in FIG. 4.

As described above, during precharging of the smoothing capacitor 19 when the vehicle 1 is started, if a timeout occurs before the condition regarding the capacitor voltage Vcon is satisfied, the power supply control apparatus for the electric car 1 according to the present embodiment permits a retry of the precharging under the condition that the precharge current Ipre decreases to the permission determination value I0 or smaller (enters the permission region E) before the precharge period elapses.

Since the permission determination value I0 is set slightly smaller than the permissible current for the resistance element 21, even if the precharging is retried, it does not cause the peripheral members of the resistance element 21 to be eroded. If the cause of the timeout is a transient defect, the vehicle 1 may be started by retrying the precharging. This prevents erosion of the peripheral members of the resistance element 21 resulting from an inappropriate retry of the precharging. Possible disabling of driving of the vehicle 1 can thus be preventatively avoided if a timeout is caused by a transient defect.

Second Embodiment

Simply stated, a technique according to the present embodiment is based on the idea that a situation where the precharge current Ipre decreases to a value determined to indicate completion of precharging even though a timeout has occurred before completion of the precharging is assumed to correspond to an open circuit failure.

Figure 6:
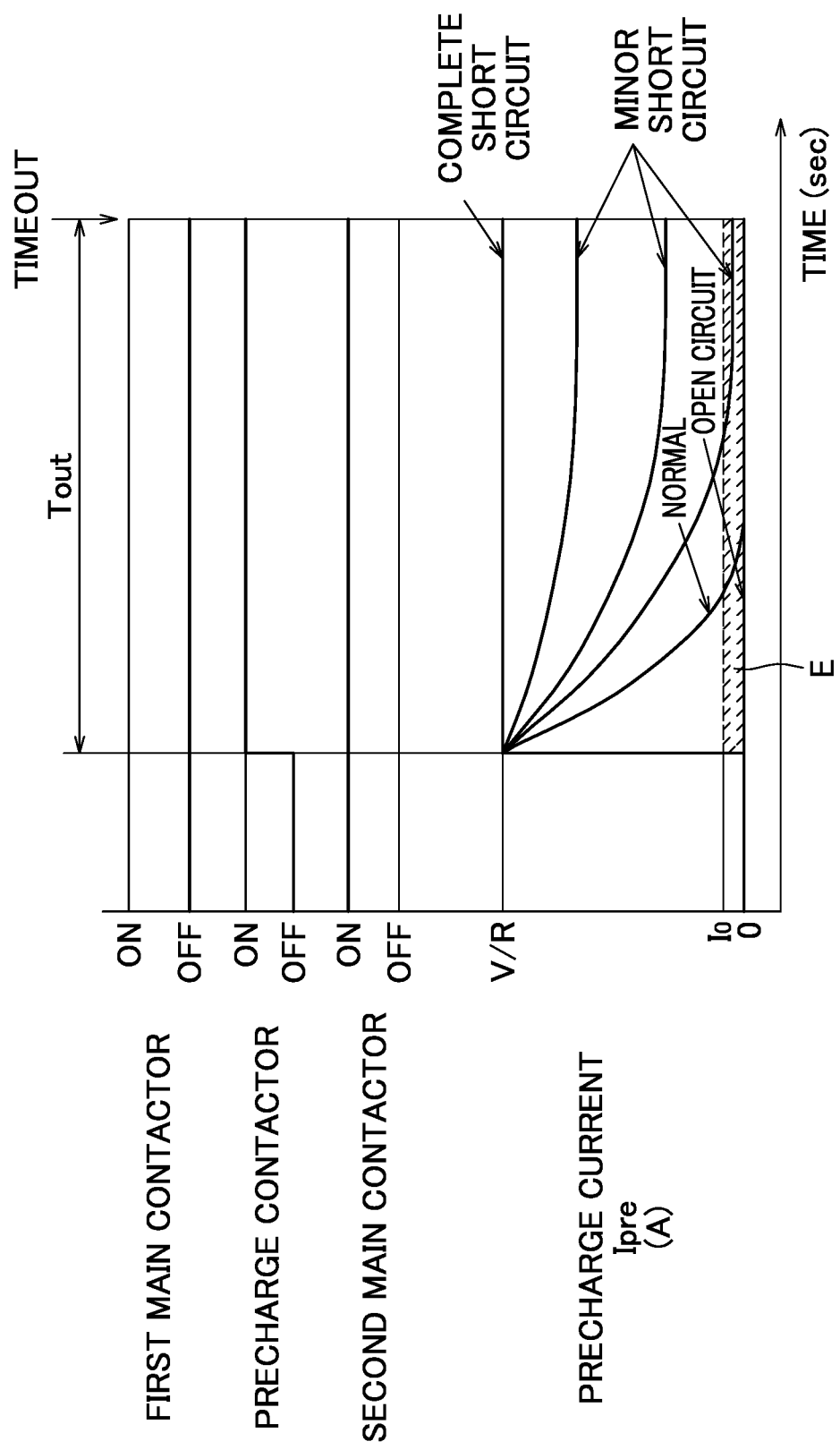
FIG. 6 is a time chart illustrating determination of whether or not to permit a retry based on a variation in precharge current according to the second embodiment.

FIG. 6 is a time chart illustrating determination of whether or not to enable a retry based on a variation in precharge current Ipre. The precharge current Ipre obtained when precharging of the smoothing capacitor 19 is normally completed to satisfy the condition regarding the capacitor voltage Vcon ($\Delta V \leq \Delta V0$) can be determined by the capacitor voltage Vcon/a resistance R of the resistance element 21. In the present embodiment, the precharge current Ipre in this case is set as the permission determination value I0, and a retry of the precharging is permitted if the precharge current Ipre decreases to the permission determination value I0 or smaller during the precharging.

Therefore, when the permission region E for the precharging is defined based on current and periods, the permission region E may be expressed as a region spanning the entire period of the precharging (predetermined period) and having a lower limit of 0 A and an upper limit equal to the permission determination value I0 (predetermined current range). A retry of the precharging is permitted under the condition that the precharge current Ipre enters the permission region E.

When precharging the smoothing capacitor 19, the ECU 25a executes the precharge completion determination process illustrated in FIG. 4, and in parallel with this, executes the process of determining whether or not to enable a retry of the precharging. The contents of the process of determining whether or not to enable a retry is the same as the contents of the process of determining whether or not to enable a retry described in the first embodiment with reference to FIG. 5, except for setting of the permission determination value I0 in step S15. Differences from the first embodiment will thus be focused on in the following description.

If the process of starting the vehicle 1 is not executed during precharging (steps S11, S13), the ECU 25a executes determination regarding the elapsed time t in step S14 and executes determination regarding the precharge current Ipre in step S15. A trajectory that may be followed by the precharge current Ipre when the determination in step S14 is Yes corresponds to one of a complete short circuit failure and a minor short circuit failure in which the precharge current Ipre comes to equilibrium on a high current side with respect to the permission determination value I0, as illustrated in FIG. 3. Both cases correspond to a timeout. Any failure is thus assumed to have occurred in the power supply circuit 7, and the ECU 25a inhibits a retry of the precharging in step S17.

A trajectory that may be followed by the precharge current Ipre when the determination in step S15 is Yes corresponds to one of the normal state of the power supply circuit 7 in which the precharge current Ipre gradually approaches 0 A, a minor short circuit failure in which the precharge current Ipre comes to equilibrium on a low current side with respect to the permission determination value I0, and an open circuit failure in which the precharge current Ipre is maintained at 0 A, as illustrated in FIG. 3. However, even though the precharging is to be determined to be completed in the normal state of the power supply circuit 7 and in the case of a minor short circuit failure of a magnitude smaller than or equal to the permission determination value I0, a timeout has occurred. These situations may thus be excluded. An open circuit failure may therefore be assumed to have occurred in the power supply circuit 7. The open circuit failure has no possibility of causing the resistance element 21 to generate heat, and thus, a retry of the precharging is permitted in step S16.

As described above, if a timeout occurs before precharging is completed as is the case with the first embodiment, the power supply control apparatus for the electric car 1 according to the present embodiment permits a retry of the precharging under the condition that the precharge current Ipre decreases to the permission determination value I0 or smaller (enters the permission region E).

The permission determination value I0 is set as the precharge current Ipre resulting from satisfaction of the condition regarding the capacitor voltage Vcon. The situation where the precharge current Ipre decreases to the permission determination value I0 or smaller even though a timeout has occurred is assumed to correspond to an open circuit failure. A retry of the precharging does not cause the resistance element 21 to generate heat. If the cause of the timeout is a transient defect, the vehicle 1 may be started by retrying the precharging. This prevents erosion of the peripheral members of the resistance element 21 and thus allows possible disabling of driving of the vehicle 1 to be preventatively avoided.

Compared to the present embodiment, the first embodiment involves the permission region E extended toward the high current side. A retry of the precharging is thus permitted in the case of not only an open circuit failure but also a minor short circuit failure (Ipre≤I0). The first embodiment is thus desirable in terms of avoidance of disabling of driving. In contrast, the first embodiment does not lead to erosion of the peripheral members but involves heat generation of the resistance element 21. The second embodiment is thus desirable in terms of protection of the resistance element 21.

Therefore, the method of one of the two embodiments may be selected depending on what is focused on.

Third Embodiment

Simply stated, a technique according to the present embodiment is based on the idea that a situation where the precharge current Ipre enters a low-current-side region with respect to a trajectory followed by the precharge current Ipre in the normal state is assumed to correspond to an open circuit failure.

Figure 7:
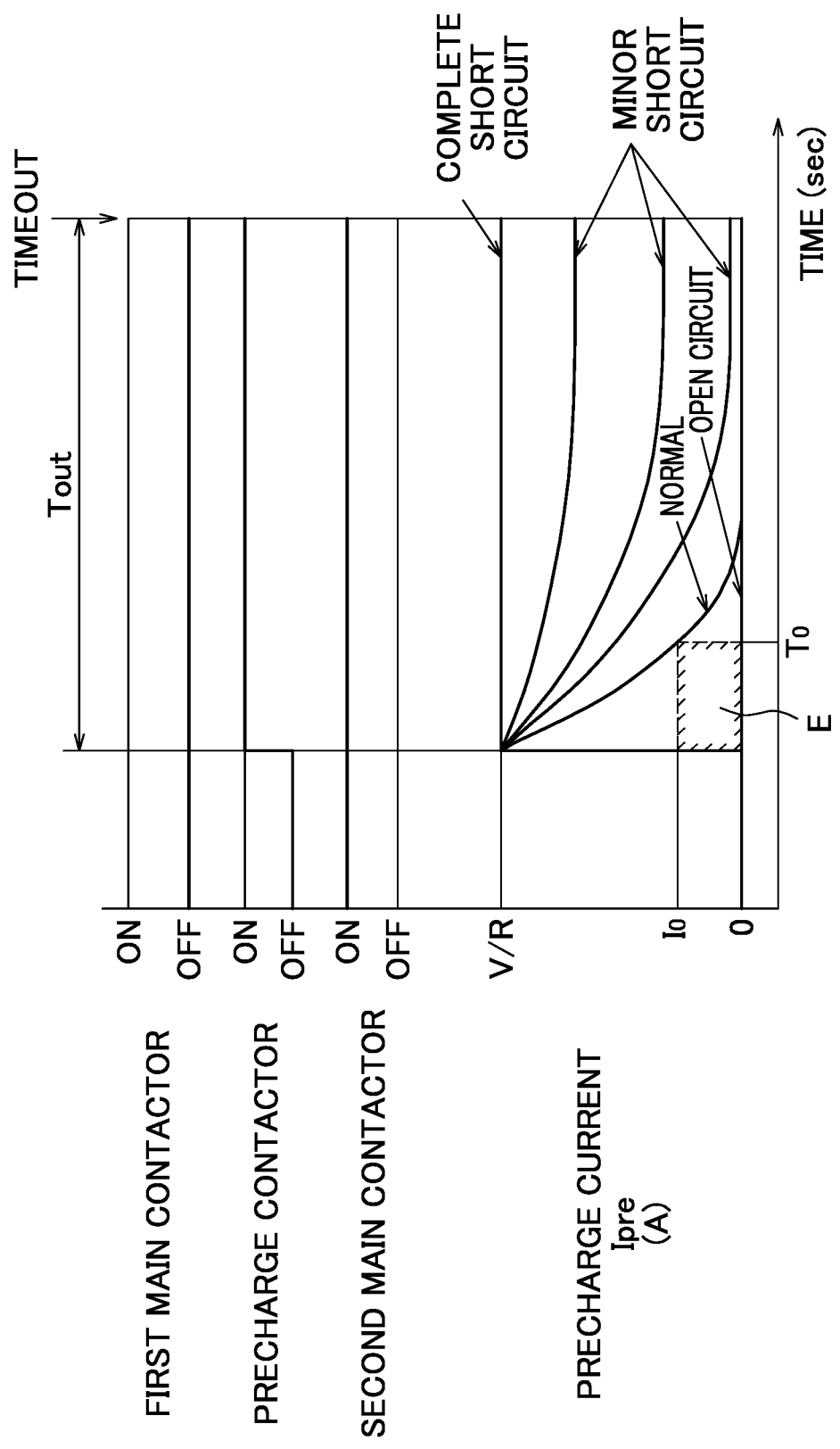
FIG. 7 is a time chart illustrating determination of whether or not to permit a retry based on a variation in precharge current according to a third embodiment.

FIG. 7 is a time chart illustrating determination of whether or not to enable a retry based on a variation in precharge current Ipre. If precharging of the smoothing capacitor 19 is normally completed, the precharge current Ipre rises simultaneously with turn-on of the precharge contactor 20 and subsequently gradually decreases to approach 0 A, as illustrated by a solid line in FIG. 7. The permission region E is set on a low current side with respect to the trajectory of the precharge current Ipre in this case. In the present embodiment, the permission region E is set to have a lower limit of 0 A and an upper limit equal to the permission determination value I0 (predetermined current range) and to span a period from the start of the precharging until a permissible time T0 elapses (predetermined period).

FIG. 7 illustrates a single trajectory followed by the precharge current Ipre in the normal state. However, the trajectory in the normal state may vary due to, for example, individual differences among the power supply circuits 7. The permission region E is thus set on a slightly lower current side with respect to the trajectory in the normal state, where the precharge current Ipre decreases most rapidly.

If the precharge current Ipre decreases to the permission determination value I0 or smaller before the permissible time T0 elapses, in other words, if the precharge current Ipre enters the permission region E, a retry of the precharging is permitted.

Figure 8:
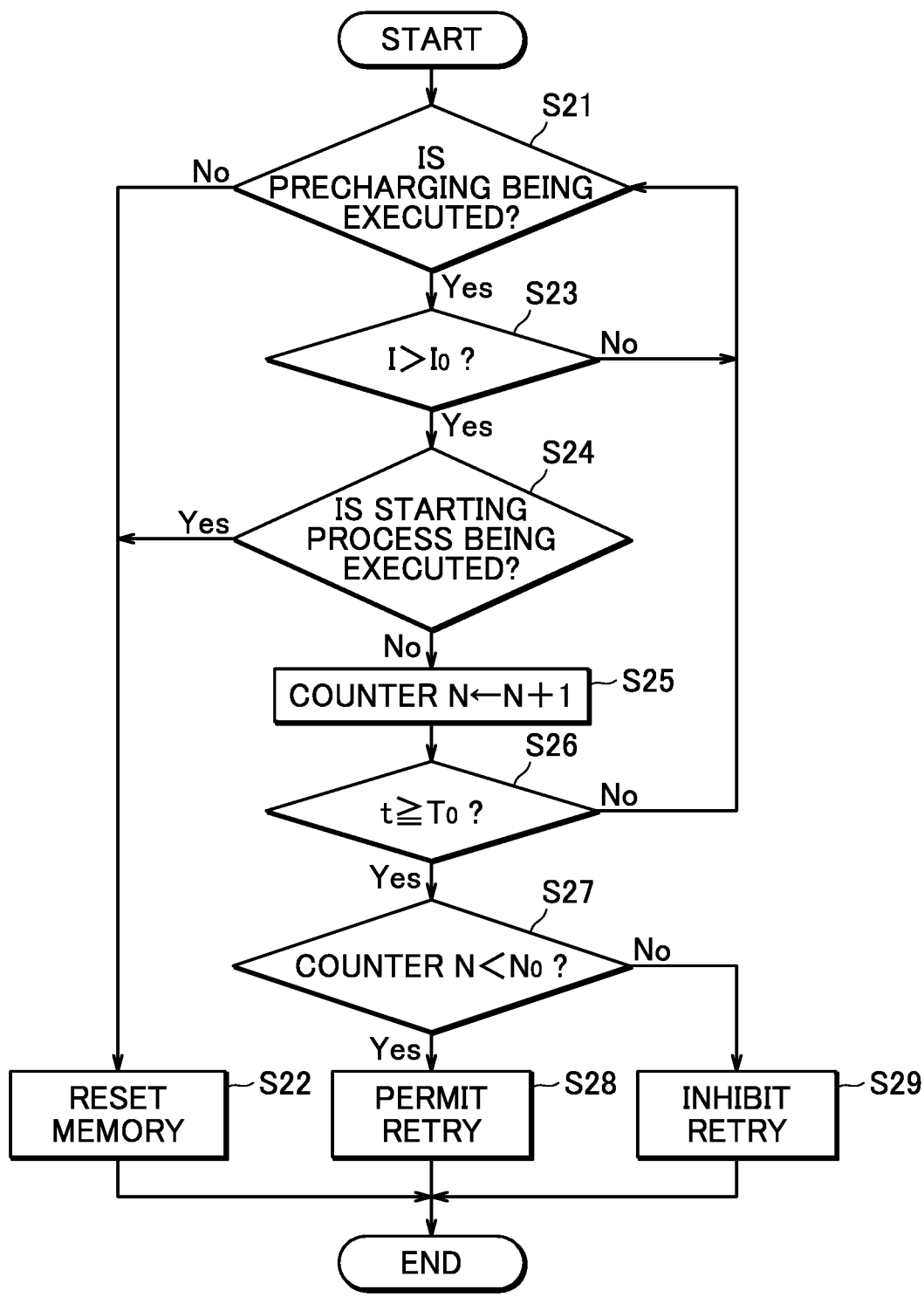
FIG. 8 is a flowchart of a process of determining whether or not to permit a retry of precharging which is executed by the ECU according to the third embodiment and a fourth embodiment.

When precharging the smoothing capacitor 19, the ECU 25a executes the precharge completion determination process illustrated in FIG. 4, and in parallel with this, executes the process of determining whether or not to enable a retry of the precharging as illustrated in FIG. 8.

First, the ECU 25a determines in step S21 whether or not precharging is being executed. When the determination in step S21 is No, in step S22, the ECU 25a resets the memory and then ends the routine.

When the determination in step S21 is Yes, the ECU 25a shifts to step S23 to determine whether or not the precharge current Ipre exceeds the permission determination value I0. When the determination in step S21 is No, the ECU 25a returns to step S21. When the determination in step S23 is Yes, the ECU 25a determines in step S24 whether or not the process of starting the vehicle 1 is being executed. When the determination in step S24 is Yes, the ECU 25a shifts to step S22. When the determination in step S24 is No, the ECU 25a increments a counter N to (N+1) in step S25, and determines in step S26 whether or not the elapsed time t from the start of the precharging has reached the permissible time T0.

When the determination in step S26 is No, the ECU 25a returns to step S21. When the determination in step S26 is Yes, the ECU 25a determines in step S27 whether or not the counter N indicates a value smaller than the number of determination times NO. When the determination in step S27 is Yes (N<NO), the ECU 25a permits a retry of the precharging in step S28. When the determination in step S27 is No (N≥NO), the ECU 25a inhibits a retry of the precharging in step S29.

As described above, if a timeout occurs before precharging is completed, the power supply control apparatus for the electric car 1 according to the present embodiment permits a retry of the precharging under the condition that the precharge current Ipre enters the permission region E set on a low current side with respect to the trajectory followed by the precharge current Ipre in the normal state of power supply circuit 7.

Except for an open circuit failure, the precharge current Ipre decreases most rapidly in the normal state of the power supply circuit 7. In this case, no situation but an open circuit failure involves a case where the precharge current Ipre enters a low-current-side permission region E with respect to the trajectory followed by the precharge current Ipre, and a retry of the precharging does not cause the resistance element 21 to generate heat. If the cause of the timeout is a transient defect, the vehicle 1 may be started by retrying the precharging. This prevents erosion of the peripheral members of the resistance element 21 and thus allows possible disabling of driving of the vehicle 1 to be preventatively avoided.

Fourth Embodiment

Simply stated, a technique according to the present embodiment is based on the idea that a situation where the precharge current Ipre, which is to flow during precharging, fails to be detected is assumed to correspond to an open circuit failure.

Figure 9:
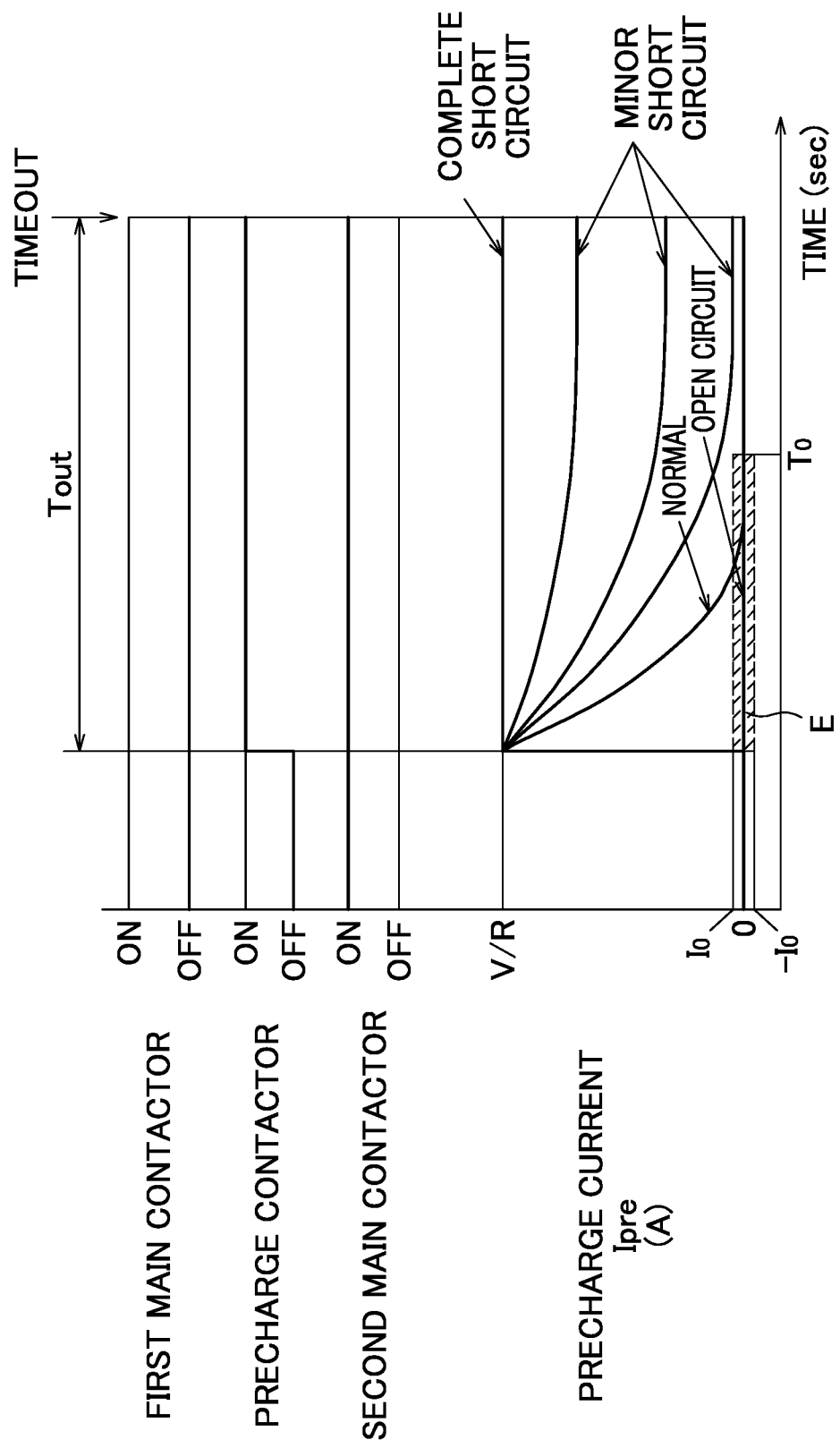
FIG. 9 is a time chart illustrating determination of whether or not to permit a retry based on a variation in precharge current according to the fourth embodiment.

FIG. 9 is a time chart illustrating determination of whether or not to enable a retry based on a variation in precharge current Ipre. An output from the current sensor 23 contains a detection error, and the detection error may occur either on a positive side or on a negative side with respect to actual 0 A. Thus, to allow a maximum possible detection error with respect to 0 A to be included, the permission region E is set to have an upper limit equal to a permission determination value I0 slightly away from the detection error toward the positive side and a lower limit equal to a permission determination value −I0 slightly away from the detection error toward the negative side (predetermined current range) and to correspond to a period from the start of precharging until the predetermined permissible time T0 elapses (predetermined period). If the precharge current Ipre enters the permission region E before the permissible time T0 elapses, a retry of the precharging is permitted.

When precharging the smoothing capacitor 19, the ECU 25a executes the precharge completion determination process illustrated in FIG. 4, and in parallel with this, executes the process of determining whether or not to enable a retry of precharging. The contents of the process of determining whether or not to enable a retry is the same as the contents of the process of determining whether or not to enable a retry described in the third embodiment with reference to FIG. 8, except for setting of the permission determination value I0 in step S23 and setting of the permissible time T0 in step S26. Differences from the third embodiment will thus be focused on in the following description.

During precharging, the ECU 25a determines in step S23 whether or not the precharge current Ipre exceeds the permission determination value I0, and in accordance with the result of the determination, executes a counter process in step S25. When the determination in step S26 is Yes based on the elapse of the permissible time T0, the ECU 25a determines in step S27 whether or not the counter N indicates a value smaller than the number of determination times N0.

When the determination in step S27 is Yes, the ECU 25a grants permission to retry the precharging, i.e., the ECU 25a permits a retry of the precharging in step S28. When the determination in step S27 is No, the ECU 25a does not grant permission to retry the precharging, i.e., the ECU 25a inhibits a retry of the precharging in step S29.

As described above, if a timeout occurs before precharging is completed, the power supply control apparatus for the electric car 1 according to the present embodiment permits a retry of the precharging under the condition that the precharge current Ipre enters the permission region E set to include a detection error in the current sensor 23 with respect to 0 A.

If the precharge current Ipre enters the permission region E, the actual precharge current Ipre is assumed to be 0 A regardless of the detection error included in the output from the current sensor 23. No situation but an open circuit failure involves a case where the precharge current Ipre, expected to flow during the precharging, fails to flow during the precharging, and in this case, a retry of the precharging does not cause the resistance element 21 to generate heat. If the cause of the timeout is a transient defect, the vehicle 1 may be started by retrying the precharging. This prevents erosion of the peripheral members of the resistance element 21 and thus allows possible disabling of driving of the vehicle 1 to be preventatively avoided.

Embodiments have been described, but aspects of the present invention are not limited to the embodiments. For example, the above-described embodiments are implemented in the power supply control apparatus for the electric car 1. However, the present invention is not limited to this but may be applied to any vehicle including a precharge circuit for precharging a smoothing capacitor of a power supply circuit. For example, the present invention is applicable to a hybrid vehicle equipped with an electric motor and an engine as a driving power source.

Furthermore, in the above-described embodiments, when a retry of precharging is permitted, the precharging is automatically retried (step S5 in FIG. 4). However, the precharging may be manually retried.

What is claimed is:
1. A power supply control apparatus for an electric vehicle, the power supply control apparatus comprising:
   a main circuit including a smoothing capacitor connecting a power supply to an electric load driven by the power supply to smooth a fluctuation in an input voltage to the electric load;
   a main contactor interposed between the power supply of the main circuit and the electric load;
   a precharge circuit connected in parallel with the main contactor and including a precharge contactor and a resistance element;
   a voltage detector that detects, as a capacitor voltage, a voltage of the smoothing capacitor gradually increasing with progression of charging during the precharging;
   a current detector that detects, as a precharge current, a current flowing through the main circuit and gradually decreasing with progression of charging of the smoothing capacitor during the precharging;
   a controller configured to:
   connect the main contactor and the precharge contactor together to precharge the smoothing capacitor;
   determine, during the precharging, completion of the precharging by determining that the detected capacitor voltage increases to a predetermined voltage within a predetermined period of time;

when the detected capacitor voltage fails to increase to the predetermined voltage within the predetermined period of time, the controller, grant a permission to retry the precharging when the detected precharge current enters a permission region predefined based on a predetermined current range including 0 A within the predetermined period of time during the precharging, and inhibit permission to retry the precharging when the detected precharge current fails to enter the permission region within the predetermined period of time and store a failure code in a storage unit; and generate a warning indicating that the precharging has been inhibited when the failure code is stored in the storage unit.

2. The power supply control apparatus for the electric vehicle according to claim 1, wherein
the permission region is set as a region spanning an entire precharge period and having an upper limit corresponding to a permissible current based on a rated capacitance of the resistance element of the precharge circuit or a permissible amount of heat generation determined from a permissible temperature of peripheral components.

3. The power supply control apparatus for the electric vehicle according to claim 1, wherein
the permission region is set as a region spanning an entire precharge period and having an upper limit corresponding to the precharge current obtained when the precharging is normally completed.

4. The power supply control apparatus for the electric vehicle according to claim 1, wherein
the permission region is set as a low-current-side region with respect to a trajectory followed by the precharge current when the precharging is normally completed.

5. The power supply control apparatus for the electric vehicle according to claim 1, wherein
the permission region is set as a region including a detection error in the current detector that may occur centered around 0 A.

6. The power supply control apparatus for the electric vehicle according to claim 1, wherein
when the retry is permitted, the controller is configured to automatically or manually executes the retry of the precharging.

* * * * *